United States Patent [19]

Muraoka et al.

[11] Patent Number: 4,707,376

[45] Date of Patent: Nov. 17, 1987

[54] GRANULAR COMPOSITION OF DIFFICULT DIGESTIBLE POLYSACCHARIDES

[75] Inventors: Kenichi Muraoka; Yoichi Setoguchi; Tadamasa Kawase; Hiroitsu Kawata, all of Saitama; Hisamoto Komatsu, Tokyo; Makoto Uchida, Saitama, all of Japan

[73] Assignee: Yamanouchi Pharmaceutical Co., Ltd., Tokyo, Japan

[21] Appl. No.: 800,354

[22] Filed: Nov. 21, 1985

Related U.S. Application Data

[63] Continuation of Ser. No. 521,223, Aug. 8, 1983, abandoned, which is a continuation of Ser. No. 311,610, Oct. 15, 1981, abandoned.

[30] Foreign Application Priority Data

Oct. 29, 1980 [JP] Japan ................................ 55-152454

[51] Int. Cl.$^4$ .......................... A23L 1/308; A23L 1/30
[52] U.S. Cl. .................................... 426/658; 426/648; 426/804
[58] Field of Search ............... 426/285, 516, 648, 658, 426/804, 615, 640; 514/54

[56] References Cited

U.S. PATENT DOCUMENTS

| | | | |
|---|---|---|---|
| 3,573,058 | 3/1971 | Tiemstra | 426/658 |
| 3,973,008 | 8/1976 | Sugiyama et al. | 424/180 |
| 4,393,086 | 7/1983 | Masuyama | 426/804 |

FOREIGN PATENT DOCUMENTS 54-119038  9/1979  Japan.

*Primary Examiner*—Kenneth M. Schor
*Attorney, Agent, or Firm*—Burgess, Ryan and Wayne

[57] ABSTRACT

A granular composition of difficultly digestible polysaccharides (dietary fiber) is composed of a combination of one or more difficultly digestible polysaccharides selected from polysaccharides derived from roots of the plant such as glucomannan, polysaccharides derived from fruits of plants such as pectin, polysaccharides derived from seaweeds such as galactomannan, carragheenin, alginic acid, etc., various kinds of celluloses, and various kinds of brans and one or more difficultly digestible polysaccharides selected from alginates, alginic acid esters, agar, carboxymethyl cellulose salts, and pulullan.

The granular composition of this invention is useful as a dietary food or dietary food additive.

2 Claims, No Drawings

4,707,376

GRANULAR COMPOSITION OF DIFFICULT DIGESTIBLE POLYSACCHARIDES

This application is a continuation of application Ser. No. 521,223, filed Aug. 8, 1983, now abandoned, which is a continuation of U.S. application Ser. No. 311,610 filed Oct. 15, 1981, now abandoned.

FIELD OF THE INVENTION

This invention relates to a granular composition of difficultly digestible polysaccharides (dietary fibers), which is composed of substantially difficultly digestible polysaccharides only which are useful as dietary foods or dietary food additives.

More particularly, the invention relates to a granular composition of difficultly digestible polysaccharides comprising a combination of one or more difficultly digestible polysaccharides selected from polysaccharides derived from roots of the plant, polysaccharides derived from fruits of the plant, polysaccharides derived from seaweeds, various celluloses, and various brans and one or more difficultly digestible polysaccharides selected from alginates, alginic acid esters, agar, carboxymethyl cellulose salts, and pullulan.

BACKGROUND OF THE INVENTION

Difficultly digestible saccharides have a difficultly digestible property, high water absorbing property, and swelling property and are used for controlling the ingestion amount of nutritional foods and it is reported that they are effective in accelerating digestion and excretion functions, the prophylaxis of diabetes mellitus, the inhibition of the absorption in the intestine of cholesterol and bile acids in foods, the reduction of lipids in blood serum, and the prophylaxis of carcinoma of the colon. Hence they are useful as dietary foods or dietary food additives.

In these difficultly digestible polysaccharides, glucomannan which is a polysaccharide derived from roots of plants is commercially available as a dietary food at present. However, not only glucomannan itself but also dietary food compositions containing more than 50% glucomannan cannot be granulated by conventional techniques owing to the characteristics specific to glucomannan, such as high water absorbing property, swelling property, and springiness and hence they are mainly commercially available as powdered foods.

The powdered foods, however, are objectionable because of taste and when such foods are ingested, the person may choke on the powder or the powder becomes unusually sticky in the mouth or sticks to the mouth. Consequently, there is a strong demand to obviate these objectionable features.

It was also found by the inventors' investigations that these difficulties in glucomannan also occurred in galactomannan, alginic acid, and various kinds of brans. However, in regard to various celluloses, pectin, and guar gum, insofar as difficultly digestible polysaccharides are concerned, there is known a method of granulating the polysaccharide after adding thereto an excipient such as lactose, starch, etc., and a binder such as gelatin, gum arabic, etc., and a method of gradually dissolving the polysaccharide in water and then forcibly granulating the aforesaid substances using a dual axle extruding granulator such as a screw type extruding granulator (Japanese Patent Laid Open (Kokai) No. 119,038/'79).

However, in the former method, there are such difficulties that the possible content of the difficultly digestible polysaccharide is greatly restricted and the resulting product is undesirable as a dietary food or dietary food additive in the point of containing other nutritional components. Hence its use as a food is also restricted. On the other hand, in the latter method, there are objections since a relatively forcible extruding granulator as compared to an ordinary extruding granulator (rotary type extruding granulator) is employed in the method. Thus, heat of friction is liable to be generated in the extrusion step causing a possibility of changing the properties of the product and when the granulation is continuously performed, clogging of basket holes and damage to the basket are liable to occur. Moreover, when glucomannan or other difficultly digestible polysaccharides showing the same tendency as glucomannan, such as galactomannan, alginic acid, various brans, etc., are present in an amount of more than 50% of the whole amount of the composition, it is very difficult to granulate the dietary composition with good reproducibility even by the foregoing granulation methods.

SUMMARY OF THE INVENTION

The inventors have, unexpectedly, succeeded in producing granules having small specific volume with good reproducibility using difficultly digestible polysaccharides only without using any excipient and binder which are usually used in this field, by means of a rotary type extruding granulator.

That is, the invention is a granular composition of difficultly digestible polysaccharides comprising a combination of one or more difficultly digestible polysaccharides selected from polysaccharides derived from roots of the plant, polysaccharides derived from fruits of the plant, polysaccharides derived from seaweeds, various kinds of celluloses, and various kinds of brans and one or more difficultly digestible polysaccharides selected from alginates, alginic acid esters, agar, carboxymethyl cellulose salts, and pullulan.

DETAILED DESCRIPTION OF THE INVENTION

Polysaccharides derived from roots of the plant used in this invention include glucomannan, etc.; polysaccharides derived from fruits of the plant including pectin, etc.; polysaccharides derived from seaweeds including alginic acid, carragheenin, galactomannan (also obtained from beans), etc.; various kinds of celluloses including crude fibers derived from vegetables [e.g., Solka floc (trade name, made by the Pfizer Corp., U.S.S.)], hemicellulose, lignin, chemical derivatives of natural fibers, such as methyl cellulose, ethyl cellulose, carboxymethyl cellulose, carboxyethyl cellulose, etc.; and various kinds of brans which include the brans obtained from corn, wheat, rice, etc.

Also, the alginates used in this invention include sodium alginate, etc.; the carboxymethyl cellulose salts including carboxymethyl cellulose sodium, etc.; and the alginic acid esters including alginic acid isopropyl ester, etc.

The difficultly digestible polysaccharides of the former group include a polysaccharide or a mixture thereof which cannot provide granules with a good reproducibility without being accompanied by the deterioration of products and by the additions of one or a mixture of the difficultly digestible polysaccharides of the latter group with one or a mixture of the former difficultly digestible polysaccharides, the properties of tackiness and smoothness are imparted to the resultant mixture.

The granular composition of this invention is prepared by uniformly mixing 50-99 parts by weight, preferably 80-99 parts by weight, of one or a mixture of difficultly digestible polysaccharides selected from the difficultly digestible polysaccharides derived from roots of the plant, the difficultly digestible polysaccharides derived from fruits of the plant, the difficultly digestible polysaccharides having origin in seaweeds, various kinds of celluloses, and various kinds of brans with 1-50 parts by weight, preferably 1-20 parts by weight of one or a mixture of difficult to digest polysaccharides selected from alginates, alginic acid esters, agar, carboxymethyl cellulose salts, and pullulan (a dietary fiber produced outside bacterial cells in the case of cultivating black yeast), kneading the mixture with the addition of a proper amount of water or a proper organic solvent such as ethanol, isopropanol, etc., or a mixture of water and the organic solvent, granulating the kneaded mixture using an extrusion type granulator, and after sieving the granules by a proper sieving means, drying the granules.

A more preferred embodiment of the granular composition of difficult to digest polysaccharides of this invention contains one or a mixture of difficult to digest polysaccharides selected from glucomannan, galactomannan, carragheenin, alginic acid, and various brans as a first component in an amount of 50-99% of the total amount of the composition; one or a mixture of the difficult to digest polysaccharides selected from pectin and various celluloses as a second component in an amount of 0-49% of the total amount of the composition; and one or a mixture of the difficult to digest polysaccharides selected from alginates, alginic acid esters, agar, carboxymethyl cellulose salts, and pullulan as a third component in an amount of 1-50% of the total amount of the composition.

In this case, the second component means a component which can be granulated by an ordinary granulation method or a forcible granulating method but does not provide the above-described effects of the difficult to digest polysaccharides as well as cannot be granulated if it is mixed with more than 50% of the difficult to digest polysaccharide of the first component.

A composition range which is used for this invention comprises:
an edible granular composition comprises:
55-65% glucomannan
up to 3% alginic acid
10-20% pectin
10-20% crude fiber
up to 5% sodium alginate
4-8% pullulan
up to 4% agar
3-8% vegetable fiber and
up to 1% of a calcium supplying agent of
the total weight of said composition, the aforesaid ingredients being present in percentages by weight.

As a granulation method there are generally considered a method of forming non-uniform granules by simply crude-crushing the kneaded mixture and a method of forming spherical granules by a revolution-type fluidized granulator but according to the inventors' investigations, it has been confirmed that these methods have such faults as giving large specific volume of granules and being poor in reproducibility of granulation and the method of forming cylindrical granules by an extrusion-type granulator such as a rotary type granulator or a pellet mill type granulator.

Also, the granular composition of this invention can be sufficiently produced by means of an ordinary non-forcible extrusiontype granulator but the granular composition can be, as a matter of course, produced even by using a forcible dual axle extruding granulator (screw type extruding granulator) without the accompanying heat of friction.

In general, in the case of using an extrusion-type granulator, it is required to impart a proper tackiness and smoothness to a kneaded mixture (added with a liquid) and it can be first attained by the combination of the difficult to digest polysaccharides of this invention.

In addition, in the production of the granular composition, it is preferred to perform the production step in a short period of time considering the characteristics of the difficult to digest polysaccharides, such as high water absorbing property, swelling property, etc.

Also, to the granular composition of this invention may be, as a matter of course, added a dry powder of tomato, strawberry, banana, carrot, celery, parsley, onion, etc., known as vegetable fibers; a calcium supplying agent such as calcium phosphate, calcium lactate, etc., a flavoring agent such as various flavors, etc., as well as according to the use and the purpose of the foods, a small amount of starch, lactose, protein, etc., which are used for general granulation, may be desirably added to the composition of this invention.

Since the granular composition of the difficult to digest polysaccharides of this invention thus produced has a small specific volume, has no dispersion, and shows no scattering property, preparation and quality of the control of the product can be accurately and easily performed and when the granular composition is taken, it will neither cause choking nor become sticky in the mouth or stick to the mouth. Furthermore, the granular composition of this invention can be prepared by so-called dietary fibers only the composition is most ideal as a dietary food or a dietary food additive.

The invention will be further explained in detail by the following experiment and examples.

A granulation test of difficult to digest polysaccharides in various compounding ratios is shown below.

In the experiment, 500 g of a mixture of any desired difficult to digest polysaccharides in a desired compounding ratio was previously uniformly mixed. After adding 350 g of purified water to the mixture, the resultant mixture was kneaded, applied to a rotarytype extruding granulator (rotary-type granulator HUG, made by Hata Tekkosho K.K.) having a basket diameter of 130 mm and a screen diameter of 0.8 mm, and then the formation of granules was confirmed by measuring the time required for finishing the formation of granules if the granules were formed. The results are shown in the following table.

| Example No. | Formation of Granules | Time Required for Formation of Granules |
|---|---|---|
| 5 | formed | 8 min. |
| 6 | " | 5 min. |
| 7 | " | 12 min. |
| 8 | " | 9 min. |
| 9 | " | 5 min. |
| 10 | " | 10 min. |
| Control 1 | not formed | (not passing |

| Example No. | Formation of Granules | Time Required for Formation of Granules |
|---|---|---|
| Control 2 | " | through screen) |

EXAMPLES 2–10 and CONTROLS 1 and 2

By following the same procedure as in Example 1 using the components shown in the following table, the various granular compositions shown in the same table were obtained.

TABLE

| EX. NO. Component | 2 | 3 | 4 | 5 | 6 | 7 | 8 | 9 | 10 | Control 1 | Control 2 |
|---|---|---|---|---|---|---|---|---|---|---|---|
| glucomannan | 40 | 60 | 27 | 60 | 60 | 60 | 60 | 60 | 60 | 60 | 60 |
| galactomannan | 20 | — | 12 | — | — | — | — | — | — | — | — |
| bran | — | 5 | — | — | — | — | — | — | — | — | — |
| alginic acid | 3 | — | 2 | 2.5 | 2.5 | — | 3 | — | 2 | 3 | 5 |
| carragheenin | — | — | 5 | — | — | — | — | — | — | — | — |
| solka floc | 15 | 10 | 20 | 10 | 14 | 15 | 12 | 10 | 10 | 12 | 20 |
| pectin | 10 | 15 | 20 | 14 | 10 | 16 | 14 | 15 | 14 | 18 | 10 |
| carboxymethyl cellulose sodium | — | — | 3 | — | — | — | — | — | — | — | — |
| sodium alginate | 2 | — | — | — | — | 5 | — | — | 3 | — | — |
| alginic acid propyleneglycol ester | — | 1 | — | — | — | — | — | — | — | — | — |
| pullulan PF30 | 5 | 3 | 4 | 5 | 7 | — | 7 | 6 | 4 | — | — |
| agar powder | — | — | 2 | 2.5 | 2.5 | — | — | 4 | 3 | — | — |
| carrot powder | 4.2 | 5 | 8 | 5 | — | 4 | — | — | 4 | 6 | — |
| parsley powder | — | — | — | — | 3 | — | 4 | 4 | — | — | 5 |
| natural calcium phosphate | 0.8 | — | 1 | 1 | 1 | — | — | 1 | — | 1 | — |
| calcium lactate | — | 1 | — | — | — | — | — | — | — | — | — |
| purified water | 65 | 75 | 45 | 70 | 70 | 70 | 70 | 70 | 70 | 70 | 70 |

EXAMPLE 1

Powders containing 58 parts of glucomannan, 9 parts of low methoxypectin, 6 parts of high methoxypectin, 17 parts of Solka floc BW-200-NF (registered trade name, made by Pfizer Corp.), 3 parts of alginic acid, 5 parts of carrot powder, 1 part of natural calcium phosphate, and 4 parts of pullulan were uniformly mixed beforehand, and after adding thereto 70 parts of purified water, the resultant mixture was kneaded, the mixture was granulated by means of a rotary-type extruding granulator, the granules thus formed were sieved by a sieving means, and then dried by a fluidized type dryer to provide a granular composition.

What is claimed is:

1. An edible granular composition of glucomannan, said composition being a non-powder, and containing 55–65% glucomannan, up to 3% alginic acid, 10–20% pectin, 10–20% crude fiber, up to 5% sodium alginate, 4–8% pullulan, up to 4% agar, 3–8% vegetable fiber, and up to 1% of a calcium supplying agent of the total weight of said composition, said composition being produced by uniformly mixing glucomannan with alginic acid, pectin, crude fiber, sodium alginate, pullulan, agar, vegetable fiber, and a calcium supplying agent; kneading the composition thus formed with a mixture of water and either ethanol or isopropanol; granulating the kneaded mixture is an extrusion-type rotary-type granulator to provide granules of said composition; sieving the granules; and drying the sieved granules without using any excipient and binder.

2. The composition of claim 1 wherein the extrusion-type granulator has a screen diameter of 0.8 mm.

* * * * *